Figures 1, 2, 3:
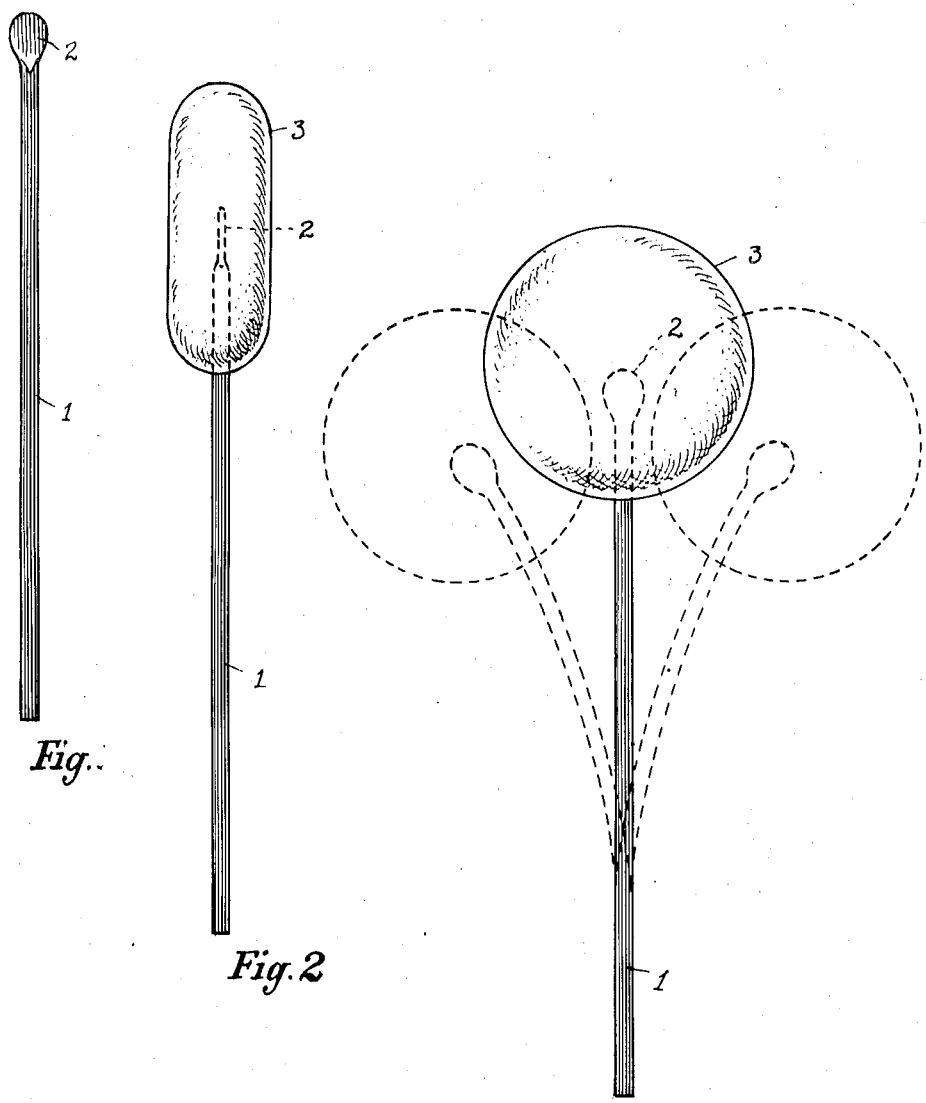

Aug. 28, 1934.   G. J. GUYON   1,971,560
CANDY AND HOLDER THEREFOR
Original Filed Oct. 22, 1928

Inventor:
George J. Guyon
By Kent W. Donnell Atty.

Patented Aug. 28, 1934

1,971,560

UNITED STATES PATENT OFFICE 1,971,560

CANDY AND HOLDER THEREFOR

George J. Guyon, Chicago, Ill., assignor, by mesne assignments, to Parker-Meyer-Dennis Company, Dubuque, Iowa, a corporation of Iowa Application October 22, 1928, Serial No. 314,063
Renewed May 29, 1933

7 Claims. (Cl. 99—16)

This invention relates in general to a candy of the sucker type mounted upon a holder, the common variety being known as a lolli-pop.

One of the principal objects of the invention is in the provision of a holder for candy which is mounted at one end so that if the outer end of the holder is engaged by falling or by accident while the candy is held in the mouth, the inner end will be less likely to injure the person eating the candy.

A further object of the invention is in the provision of a flexible holder for candy which will give or spring when engaged so that the mouth of a user will not be injured when the outer end of the stick is engaged; a still further object is the provision of a candy holding stick which is manufactured to size and shape with an enlarged holder at one end for engaging the candy, and a flexible shaft for supporting the candy which will bend or flex when unduly engaged.

Other objects will appear hereinafter, the accompanying drawing illustrating a preferred embodiment of the invention. In the drawing, Fig. 1 shows a stick constructed in accordance with the principles of this invention; Fig. 2 is a side view of a stick with candy applied thereto; and Fig. 3 illustrates a stick with a piece of candy applied thereto, the broken outlines indicating that the stick may be bent in different directions due to its flexibility.

When lolli-pops are placed in the mouth with the stick protruding therefrom, there is great danger if the stick should strike an obstruction or if the person eating the lolli-pop should happen to fall, particularly if the candy end of the stick is pointed or if the stick should happen to break off close to the candy in such an accident.

Another objection to the sticks commonly used for lolli-pops is that they are neither uniform in size nor in straightness, and in applying the candy to them there is much waste because of the lack of uniformity.

The present invention overcomes these objections by providing a flexible stick 1 of rubber or other suitable material which is molded or formed accurately to shape and size so that the sticks will be straight and uniform and may be accurately adapted to receive the candy at one end.

At the candy receiving end there is a rounded knob or projection 2 formed integrally with the stick and preferably flattened so that it can be made of the same stock as the stick itself. This projection has no sharp ends or edges which are likely to injure the mouth of the user.

The stick is usually made of rubber or fiber or some rubber composition which maintains a straight and rigid form under normal conditions but is easily bent or flexed under pressure and in all directions so that it will have the tendency if the candy is contained in the mouth to deflect if the end of the stick is engaged by an obstruction so that the stick will bend rather than break or splinter and so that there will be less liability of the candy end of the stick engaging or injuring the mouth of a user.

Any candy or confection or even an apple or other edible material may be applied to the end of the stick and is intended to be included in the term candy in this connection. The projection 2 offers an additional contact surface for holding candy 3 at the end of the stick either to be molded thereon or the stick to be inserted in the candy, and as the projection is flattened it will enter the candy easily and will remain in place thereon without a tendency to rotate on the stick or become disengaged therefrom because of the enlargement or head 3.

It will be understood that the edible material, such as the confection 3, may be joined to the handle or stick 1 either simultaneously with the formation of the edible material, or after the formation of the edible material, by a usual or preferred method. One such method known in the art includes forcing that portion of the stick or handle to be embedded inwardly of the edible material in a direction transversely of the major axis of the handle material or stick, and subsequently causing the edible material to adhere to that portion of the stick or handle which has previously been forced into or embedded in the edible material, by pressing the edible material into contact with the embedded handle or stick material, or by any other suitable method for causing adherence therebetween.

While I have described a preferred embodiment of my invention, many modifications may be made without departing from the spirit of the invention, and I do not wish to be limited to the precise details of construction set forth, but desire to avail myself of all changes within the scope of the appended claims.

I claim:

1. A flexible rubber confection supporting stick with a rounded enlargement at the end to avoid injury if broken in the mouth of a user.

2. A flexible rubber candy stick flattened to hold a confection thereon and to prevent it from turning and rounded at the end to prevent damage to a user.

3. A safety handle holder for candy, confections, or the like, comprising an elongated handle formed from readily bendable material but of sufficient rigidity to support the confection in an upright position, one end thereof being adapted to be embedded in the confection, the end that is embedded in the confection being provided with a blunt guard.

4. A readily bendable confection supporting stick having sufficient rigidity to maintain an upright position and with an unpointed projection at the end which is inserted in the confection.

5. An article adapted to be eaten for food, in combination with an elongated handle formed from flexible material of sufficient rigidity to support said article adapted to be eaten for food in an upright position, said handle having a blunt end embedded in said article adapted to be eaten for food.

6. A safety handle for an article adapted to be eaten as food, comprising an elongated member of rubber sufficiently rigid to support the article adapted to be eaten as food, in an upright position, but sufficiently flexible as to be substantially incapable of injuring the features of a person by an end-on thrust of said elongated member of rubber.

7. A safety handle for a solidified edible of the confection class, comprising a member sufficiently rigid to support the solidified edible of the confection class in an upright position, but sufficiently flexible as to be substantially incapable of injuring the features of a person by an end-on thrust of said member, said member having a blunt end adapted to be embedded in said solidified edible of the confection class.

GEORGE J. GUYON.